United States Patent [19]

Bothe et al.

[11] Patent Number: 4,883,698
[45] Date of Patent: Nov. 28, 1989

[54] MULTILAYER FILM CONTAINING A BIAXIALLY ORIENTED POLYPROPYLENE FILM

[75] Inventors: Lothar Bothe, Mainz; Guenther Crass, Taunsstein-Wehen; Siegfried Janocha, Weisbaden; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 141,728

[22] Filed: Jan. 11, 1988

[30] Foreign Application Priority Data

Jan. 17, 1987 [DE] Fed. Rep. of Germany ....... 3701307

[51] Int. Cl.$^4$ ..................... B65D 65/40; B32B 27/08; B32B 27/32
[52] U.S. Cl. .................................. 428/35.9; 428/349; 428/216; 428/516; 428/451; 428/910; 428/447
[58] Field of Search ....................... 428/35.9, 349, 216, 428/451, 516, 447, 461

[56] References Cited

U.S. PATENT DOCUMENTS 4,119,479 10/1978 Williams, Jr. ......................... 156/272
4,211,811 7/1980 Bordini et al. ....................... 428/220
4,230,767 10/1980 Isaka et al. ........................... 428/349

FOREIGN PATENT DOCUMENTS 0021672 1/1981 European Pat. Off. .
0038022 10/1981 European Pat. Off. .
0069642 1/1983 France .

Primary Examiner—P. C. Ives
Attorney, Agent, or Firm—Foley & Lardner, Schwartz, Jeffery, Schwaab, Mack, Blumenthal & Evans

[57] ABSTRACT

For packaging purposes, metallized multilayer films containing a biaxially oriented polypropylene film as a base layer should have high scratch resistance, good heat-sealing properties, such as low heat-sealing temperature, attractive visual properties, such as high metallic luster, excellent metallizability of the base layer or of a covering layer, and also good processing properties during metallization, printing, slitting, and during processing on fast-running packaging machines. This requirement profile is fulfilled by a multilayer film of asymmetric structure containing a biaxially oriented base layer 4 composed of polypropylene, a heat-sealing layer 3 which contains an additive combination composed of pigment in platelet form and siloxane and which is optionally modified by an addition of polypropylene and a hydrocarbon resin, and of a corona-treated polypropylene covering layer 2 which is not capable of being heat-sealed. A corona-treated, heat-sealable copolymer may also be used as the covering layer 2, instead of a covering layer 2 composed of non-heat-sealable polypropylene. The covering layer 2 can also be omitted; in that case the surface of the base layer 4 is metallized. Tubular bags, jackets, containers of various shape for packaging foodstuffs, including the vacuum packaging of foodstuffs, are manufactured from this multilayer film.

17 Claims, 1 Drawing Sheet

MULTILAYER FILM CONTAINING A BIAXIALLY ORIENTED POLYPROPYLENE FILM

BACKGROUND OF THE INVENTION

The present invention relates to a multilayer film containing a biaxially oriented polypropylene film as a base layer having a metal layer, deposited by metallization, on one surface thereof.

German Patent No. 2,756,497 discloses a composite film for packaging purposes containing two polyolefin films and an intermediately situated metal layer, at least one of the two polyolefin films having been oriented by stretching and being composed of isotactic polypropylene. The metal layer is formed by metallization of one of the two films and has a specific resistance of 1 to 5 Ω·cm. The other of the two films is composed of polyethylene, polypropylene, a crystalline ethylene/propylene copolymer or of mixtures thereof and has likewise been stretched. At least one of the two films is coated with a heat-sealing layer. The purpose of said composite film is to achieve the result that permanently good barrier properties are obtained even under stress due to folding and creasing.

European Patent No. 021,672 describes a method for preparing a metal-coated oriented polypropylene film. In this method, a film substrate comprising a polypropylene core layer and an ethylene/polypropylene copolymer outer layer on at least one side of the core layer is produced by coextrusion. Neither the core layer nor the outer layer contains a lubricant. Coextrusion is followed by a biaxial orientation or stretching of the film, a corona discharge treatment of at least the outer surface of the film and by metallization of the corona-treated outer layer. The outer layer contains 2 to 4% by weight of ethylene and 96 to 98% by weight of propylene. The metal layer is composed of aluminum, copper, silver or chromium. The omission of the lubricant reinforces the adhesion between the core layer or the outer layer, on the one hand, and the metal layer, on the other hand. In a particular range, the metal layer develops barrier effects towards oxygen, water vapor and carbon dioxide.

Published European Patent Application No. 0,038,022 discloses a composite film which is composed of two layers and an intermediately situated adhesive layer, one of the layers being composed of a polyolefin film and the other layer of paper or a cardboard. The polyolefin film is metallized at least on one side, the metal layer having a resistance in the range from 1 to 5 Ω. The polyolefin film is oriented by stretching and is composed of isotactic polypropylene, polyethylene, propylene/ethylene copolymers or of mixtures of said materials, while aluminum is used for the metal layer. There is a heat-sealing layer on at least one of the two sides of the composite film.

European Patent No. 0,069,642 describes a composite film composed of two layers of a thermoplastic polymer metallized on one side, the layers being joined to each other by an adhesive layer. One of the two layers of the thermoplastic polymer is composed of ethylene glycol polyterephthalate. The two layers of the metallized thermoplastic polymer can be joined together by means of their metallized surfaces. It is equally possible to join the two layers of the metallized thermoplastic polymer to each other by means of the metallized surface and the thermoplastic surface. Aluminum is used for metallization. The thermoplastic polymer of the second layer is chosen, for example, from the group comprising ethylene glycol polyterephthalate and polypropylenes. An additional outer layer composed of a thermoplastic polymer may be deposited on the metal layer. A polyurethane may be used as adhesive between the two metal layers.

The known composite films solve one problem or another, such as, for example, increasing the metallizability of the composite film, possessing good heat-sealing properties, in particular, a low heat-sealing temperature, or improving, the processing properties after metallization, such as, for example, printing, slitting and processing in a packaging machine.

SUMMARY OF THE INVENTION

It is therefore an object of the present invention to provide an improved multilayer film.

A further object of the invention is to provide multilayer film having improved metallizability, wherein a polypropylene film is used as a base layer.

It is also on object of the invention to provide a multilayer film having reduced susceptibility to scratching.

Another object of the invention resides in providing a good optical appearance of the film as a result of the high luster of the metal layer.

Still another object of the invention is to ensure good heat-sealing properties, in particular a low heat-sealing temperature, of the film according to the invention.

It is also an object of the invention to improve the processing properties after metallization, such as printing, slitting and further processing in a packaging machine.

In accomplishing the foregoing objects, there has been provided in accordance with one aspect of the present invention a multilayer film, comprising: a biaxially oriented polypropylene film as a base layer; a first surface layer comprising a metal layer deposited by metallization on a surface which is free from organic additives, such as lubricants or antistatic agents and which has been exposed to a corona discharge before the metallization; and a second surface layer comprising a heat-sealing layer containing an additive combination comprised of an inorganic pigment and a polydiorganosiloxane, the second surface layer being applied on one surface of the base layer. In one embodiment, the multilayer film further includes an intermediate layer between the base layer and the metal layer, this intermediate layer containing from about 0.1 to 0.7% by weight of an inorganic pigment and comprising a non-heat-sealable corona-treated polypropylene.

In accordance with another aspect of the invention, there has been provided a package which includes at least one wall made of the above-described multilayer film material.

Further objects, features and advantages of the present invention will become apparent from the detailed description of preferred embodiments that follows, when considered together with the attached figures of drawing.

DETAILED DESCRIPTION OF THE PREFERRED EMBODIMENTS

The film according to the invention is built up non-symmetrically from layers which are different from each other, wherein the surface facing the metal layer is free from organic additives such as lubricants and antistatic agents and has been exposed to a corona discharge before the metallization. A heat-sealing layer containing an additive combination composed of an inorganic pigment and polydiorganosiloxane has been deposited as a covering layer on the nonmetallized, heat-sealable surface of the base layer.

The film according to the invention fulfills in an exemplary manner all of the requirements contained in the profile of properties enumerated above.

A metal layer with a high luster is obtained by metallization as a result of the asymmetric structure involving a corona-treated unmodified smooth polypropylene surface. The low heat-sealing temperature of 100° C and below is achieved by the special polyolefin resin composition, with the addition of polypropylene and/or hydrocarbon resin resulting in the increase in scratch resistance. As a result of the one-sided pigmentation in conjunction with the siloxane modification, a good processability during slitting, metallization and, optionally, printing, and an excellent processability in fastrunning packaging machines are achieved.

Bags, tubular packagings, jackets, containers of various shapes and other containers which are employed, in particular, for foodstuff packaging, including the vacuum packaging of foodstuffs, are formed from the multilayer film of the invention. It is also suitable for the production of gift wrapping paper.

The structure of a multilayer film according to the invention is briefly explained by reference to the drawings.

Figure 1:
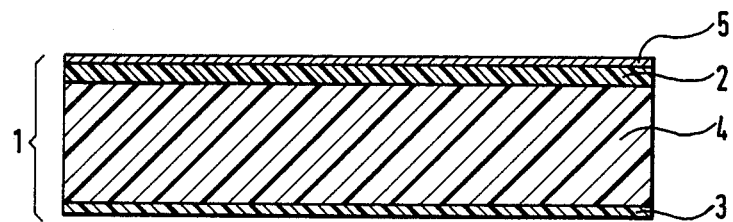
FIG. 1 shows a so-called ABC structure of a multilayer film in section.

A multilayer film 1 according to FIG. 1 is composed of a covering layer 2 which is not capable of being heat-sealed, a biaxially oriented polypropylene film as the base layer 4, and a heat-sealing layer 3. On the covering layer 2 there is a metal layer 5. The layers 2, 3 and 4 differ from each other in their composition and in their pretreatment. For these reasons, the structure of the multilayer film is described as a non-symmetrical ABC structure. The metal layer 5 is prepared by metallization of the surface of the covering layer 2, which surface is not pigmented and is free of organic additives, such as lubricants and antistatic agents. The metallization is preferably carried out with aluminum. The specific surface resistance of the metal layer is in this case, in particular, from about 1 to 5 Ω·cm. To improve the adhesion of the metal layer to the base layer, the latter is exposed to a corona discharge before the metallization. The heat-sealing layer 3 deposited on the opposite, non-metallized surface of the base layer 4 contains an additive combination composed of an inorganic pigment and siloxane. In this connection, the heat sealing layer 3 may consist of $C_2$, $C_2C_3$, $C_2C_4$, $C_3C_4$, $C_2C_3C_4$ raw materials or mixtures of said raw materials where $C_2$ denotes ethylene, $C_3$ denotes propylene and $C_4$ denotes butylene. The inorganic pigment in the heat-sealing layer is, for example, aluminum silicate in platelet form, while the siloxane in the heat-sealing layer may be a polydialkylsiloxane. Additionally, the heat-sealing layer 3 may be modified also with a polypropylene homopolymer and/or a hydrocarbon resin. The heat-sealing temperature of the heat-sealing layer is less than or equal to 100° C and consequently is lower than the heat-sealing temperature of comparable heat-sealing layers.

The heat-sealing layer is, for example, composed of an olefin resin comprising a mixture of an ethylene/propylene/butylene terpolymer and a propylene/butylene copolymer, having a content of about 0.1 to 7% by weight of ethylene, about 53 to 89.9% by weight of propylene and about 10 to 40% by weight of butylene.

The siloxane is, for example, a dimethylpolysiloxane having a viscosity of about 1,000 to 50,000 mm$^2$/s at 25° C in a concentration of 0.2 to 0.8% by weight.

The covering layer 2, which is not capable of being heat-sealed is composed of corona-treated polypropylene and contains about 0.1 to 0.7% by weight of an inorganic pigment. Optionally, instead of the polypropylene covering layer 2 which is not capable of being heat-sealed, a corona-treated heat-sealable covering layer composed of a copolymer may also be used.

The total thickness of the multilayer film is between about 10 and 35 μm, in particular the thickness is between about 15 and 30 μm. The thicknesses of the two covering layers 3 and 2 are each about 0.1 to 1.5 μm, in particular about 0.3 to 1.0 μm.

Figure 2:
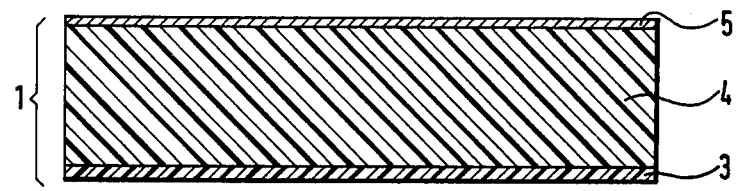
FIG. 2 shows a so-called AB structure of the multilayer film according to the invention.

FIG. 2 shows a multilayer film which is composed of the base layer 4 and the heat-sealing layer 3, these two layers having the same composition as described by reference to FIG. 1 so that a repetition of the description is superfluous. The base layer 4 supports a metal layer 5, for example, of aluminum. The non-metallized surface of the heat-sealing layer 3 may be subjected to a corona discharge in order to increase the processability of the multilayer film during printing.

The invention is explained in more detail below with reference to exemplary embodiments.

EXEMPLARY EMBODIMENT 1

The layer thicknesses of the ABC structure shown in FIG. 1 for the individual layers are:

layer C = 1 μm
layer B = 23 μm
layer A = 1 μm which results in a total thickness of 25 μm if the thickness of the metal layer in FIG. 1 is neglected. In FIG. 1 the layer A is allocated the reference numeral 3, the layer B the reference numeral 4, and the layer C the reference numeral 2.283

Layer C. The raw material of the layer C is a random $C_2C_3$ copolymer containing 4.5% by weight of ethylene and having a melt flow index of 7 g/10 min. The side of layer C to be metallized is coronatreated to a surface tension of 39 mN/m.

Layer B is a 100% PP homopolymer having a melt flow index of 3 g/10 min at 230° C and a loading of 21.19 N (2.16 kgf).

Layer A is composed of a heat-sealing raw material containing 50% by weight $C_2C_3C_4$ terpolymer containing 1.4% by weight of $C_2$, 2.8% by weight of C4 and 95.8% by weight of $C_3$ and also 50% by weight of $C_3C_4$ copolymer containing 66.8% by weight of $C_3$ and 33.2% by weight of $C_4$. The heat-sealing raw material contains 0.4% aluminum silicate having a mean particle size of 0.55 μm, 0.5% polydimethylsiloxane having a viscosity of 30,000 mm$^2$/sec and 8% hydrogenated cyclopentanediene resin having a softening temperature of 125° C. The melt flow index is 8 g/10 min.

The multilayer film is prepared by the usual coextrusion technique using a two-stage stretching and a melt temperature of 260° C. The longitudinal stretching is carried out at 130° C with a stretch/draw ratio of $\lambda_L = 5.0$, and the transverse stretching is carried out at 165° C with a stretch/draw ratio of $\lambda_Q = 10$.

EXEMPLARY EMBODIMENT 2

The multilayer film has the AB structure shown in FIG. 2, which corresponds to that of the exemplary embodiment 1 with layer C omitted. The side of layer B to be metallized is corona-treated to a surface tension of 39 mN/m.

EXEMPLARY EMBODIMENT 3

The multilayer film is built up like that of exemplary embodiment 1, with the difference that the layer C is composed of a PP homopolymer having a melt flow index of 4 g/10 min at 230.C and a loading of 21.19 N (2.16 kgf).

In each exemplary embodiment, the surface of the layer B or C to be metallized is first exposed to a corona discharge and then metallized using vacuum, with aluminum preferably being used. The choice of metal layer thickness is such that a surface resistance of 3.5 Ω is produced. Some characteristic parameters of non-metallized and metallized films of the exemplary embodiments 1, 2 and 3 are listed below.

| Non-metallized films | | | |
|---|---|---|---|
| Exemplary embodiment | 1 | 2 | 3 |
| Thickness (μm) | 25 | 25 | 25 |
| Luster | | | |
| corona-treated surface | 115 | 125 | 130 |
| non-corona-treated surface | 95 | 95 | 95 |
| Clouding, 4-Layer (%) | 22 | 14 | 16 |
| Scratch resistance (%), non-corona-treated | 18 | 18 | 18 |
| Heat-seal strength N/15 mm | | | |
| corona-treated | 2.5 | 0 | 0 |
| non-corona-treated | 2.5 | 2.5 | 2.5 |

| Metallized films | |
|---|---|
| Exemplary embodiment | (1 + 2 + 3) |
| Permeability to oxygen | 35 cm³/m² · 24 h · kg/cm² |
| Permeability to water vapors | 1 g/m² · 24 h |
| Metal adhesion | very, good, metal cannot be pulled off in the adhesive strip test |

A short explanation of the determination of the characteristic parameters luster, clouding, scratch resistance and heat-sealing strength is given below.

The luster is determined in accordance with DIN 67 530 using a reflectometer RB manufactured by Messrs. Dr. Lange (Federal Republic of Germany).

The clouding is determined in accordance with ASTM-D 1003-52, a 1 degree slit diaphragm being used instead of a 4 degree pinhole diaphragm, and the clouding being measured with four film layers lying on top of each other (the 4 layers were chosen because this gives the optimum measurement range).

The scratch resistance of a film is understood to mean the resistance of the film surface to changes as a result of mechanical stressing, in particular, in the case of frictional stressing, the production of linear destruction (scratches).

The increase in clouding ΔT which is caused by the scratching is, as a rule, used as a measure of the scratch resistance of a film:

$$\Delta T = T_v - T_o$$

Here Tv is to be understood to mean the clouding of the scratched film, and $T_o$ is to be understood to mean the clouding of the unchanged original film. The clouding of one film layer in each case is determined within the framework of the scratch-resistance measurement.

The measurement of the scratch resistance to frictional stressing is carried out in accordance with DIN 53 754. The measurements were carried out with an abrasion measuring apparatus of the type 1161 manufactured by Messrs. Frank (FRG), using abrasive disks of the type CALIBRASE® CS-10 F manufactured by Teledyne (USA) which were loaded with 250 g.

To determine heat-seal strength, two 15 mm wide strips were laid on top of each other and sealed at 100° C with a heat-sealing time of 0.5 sec and a heat-sealing pressure of 3 bar. The heat-sealing strength is determined by the T-peel method.

The permeabilities to oxygen and water vapor are measured according to ASTM D-1434 or ASTM E-96.

What is claimed is:

1. A multilayer film comprising:
  a biaxially oriented polypropylene film as a base layer;
  a first surface layer comprising a metal layer deposited by metallization on a surface which is free from organic additives, such as lubricants or antistatic agents, and which has been exposed to a corona discharge before the metallization, wherein said surface is a surface of said base layer or a surface of an intermediate layer; and
  a second surface layer comprising a heat-sealing layer containing an additive combination comprising an inorganic pigment and a polydiorganosiloxane, wherein said heat sealing layer is applied on the surface of said base layer opposite said first surface layer and comprises an ethylene, ethylene/propylene, ethylene/butylene propylene/butylene or ethylene/propylene/butylene polymeric material or a mixture of said polymeric materials, and wherein said inorganic pigment comprises aluminum silicate in platelet form.

2. A multilayer film as claimed in claim 1, wherein the siloxane in the heat-sealing layer comprises a polydialkylsiloxane.

3. A multilayer film as claimed in claim 1, wherein the heat-sealing layer further comprises a polypropylene homopolymer and/or a hydrocarbon resin.

4. A multilayer film as claimed in claim 1, wherein the heat-sealing layer is comprised of an olefin resin mixture comprising an ethylene/propylene/butylene terpolymer and a propylene/butylene copolymer, having a content of from about 0.1 to 7 % by weight of ethylene, from about 53 to 89% by weight of propylene and from about 10 to 40% by weight of butylene.

5. A multilayer film as claimed in claim 1, wherein the heat-sealing layer has a heat-sealing temperature of less than or equal to 100° C.

6. A multilayer film as claimed in claim 1, wherein the siloxane comprises a dimethylpolysiloxane having a viscosity of from about 1,000 to 50,000 mm²/sec at 25 C in the concentration of 0.2 to 0.8% by weight.

7. A multilayer film as claimed in claim 1, comprising said intermediate layer between said base layer and said metal layer, said intermediate layer containing from about 0.1 to 0.7% by weight of an inorganic pigment and comprising a non-heat-sealable corona-treated polypropylene.

8. A multilayer film as claimed in claim 1, having a film thickness of from about 10 to 35 μm.

9. A multilayer film as claimed in claim 1, having a film thickness of from about 10 to 30 μm.

10. A multilayer film as claimed in claim 1, wherein the thickness of the heat-sealing layer is from about 0.1 to 1.5 μm.

11. A multilayer film as claimed in claim 10, wherein the thickness of the heat-sealing layer is from about 0.3 to 1 μm.

12. A multilayer film as claimed in claim 7, wherein the thickness of the intermediate layer is from about 0.1 to 1.5 μm.

13. A multilayer film as claimed in claim 12, wherein the thickness of the intermediate layer is from about 0.3 to 1 μm.

14. A multilayer film as claimed in claim 1, wherein the metal layer is comprised of aluminum wherein the specific surface resistance of the metal layer is from about 1 to 5 Ω·cm.

15. A multilayer film as claimed in claim 1, wherein the metal layer is applied to a layer that is not heat-sealable.

16. A multilayer film as claimed in claim 1, consisting essentially of the recited layers.

17. A package comprising at least one wall made of the multilayer film as defined by claim 1.

* * * * *